United States Patent
Post et al.

(10) Patent No.: US 10,474,850 B1
(45) Date of Patent: Nov. 12, 2019

(54) OBFUSCATION OF INFORMATION OBTAINED BY A CARD READER

(71) Applicant: Capital One Services, LLC, McLean, VA (US)

(72) Inventors: Richard Post, Mechanicsville, VA (US); Nathaniel McKinnon, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/249,336

(22) Filed: Jan. 16, 2019

(51) Int. Cl.
*G06K 7/08* (2006.01)

(52) U.S. Cl.
CPC ................... *G06K 7/087* (2013.01)

(58) Field of Classification Search
CPC ....................................... G06K 7/087
USPC ...................... 235/449; 705/41, 44
See application file for complete search history.

(56) References Cited

U.S. PATENT DOCUMENTS

| | | | |
|---|---|---|---|
| 9,203,546 B1* | 12/2015 | Wade | H04K 3/228 |
| 9,292,026 B2 | 3/2016 | Bhattad | |
| 2011/0135092 A1* | 6/2011 | Lehner | G06K 7/084 380/252 |
| 2013/0087614 A1* | 4/2013 | Limtao | G06K 7/083 235/449 |
| 2013/0087615 A1 | 4/2013 | Tudor et al. | |
| 2014/0006277 A1* | 1/2014 | Rao | G06O 20/341 705/41 |
| 2014/0372305 A1* | 12/2014 | Ray | G06Q 10/06 705/44 |
| 2016/0171361 A1* | 6/2016 | Chatterton | G06F 21/77 705/41 |
| 2018/0253573 A1* | 9/2018 | Hart | G06Q 10/00 |

FOREIGN PATENT DOCUMENTS

CN      1278938      1/2001

* cited by examiner

*Primary Examiner* — Allyson N Trail
(74) *Attorney, Agent, or Firm* — Harrity & Harrity, LLP (57) ABSTRACT

An example method may include transmitting a noise signal through a reader connection of a magnetic reader element. The control component and the magnetic reader element may be associated with a card reader device of a transaction device, and the magnetic reader element may be configured to read a magnetic strip of a transaction card. The method may include receiving, from the magnetic reader element, a reader connection signal from the reader connection. The reader connection signal may include the noise signal. The method may include extracting, from the reader connection signal, a card information signal associated with the transaction card from the magnetic strip. The card information signal may be extracted based on the noise signal. The method may include performing an action associated with the card information signal.

20 Claims, 8 Drawing Sheets

OBFUSCATION OF INFORMATION OBTAINED BY A CARD READER

BACKGROUND

A transaction device may include an automated teller machine (ATM) device, a point of sale (POS) device, a kiosk device, and/or the like. An ATM device is an electronic telecommunications device that enables customers of financial institutions to perform financial transactions, such as cash withdrawals, deposits, transferring funds, obtaining account information, and/or the like, at any time and without direct interaction with employees of the financial institutions. A POS device is an electronic device used to process transaction card payments at retail locations. A kiosk device is a computer terminal featuring specialized hardware and software that provides access to information and applications for communication, commerce, entertainment, education, and/or the like. The transaction device may include a card reader capable of reading a magnetic strip of a transaction card and/or an integrated circuit (IC) or chip of the transaction card.

SUMMARY

According to some implementations, a method may include transmitting a noise signal through a reader connection of a magnetic reader element, wherein the control component and the magnetic reader element are associated with a card reader device of a transaction device, and wherein the magnetic reader element is configured to read a magnetic strip of a transaction card; receiving, from the magnetic reader element, a reader connection signal from the reader connection, wherein the reader connection signal includes the noise signal; and extracting, from the reader connection signal, a card information signal associated with the transaction card from the magnetic strip, wherein the card information signal is extracted based on the noise signal; and performing an action associated with the card information signal.

According to some implementations, a card reader device may include a magnetic reader element configured to read a magnetic strip of a transaction card; a memory; and one or more processors, communicatively coupled to the memory, to: transmit a noise signal through a reader connection of the magnetic reader element, wherein the reader connection communicatively couples the magnetic reader element with the one or more processors, analyze a reader connection signal of the reader connection, wherein the reader connection signal includes the noise signal; determine, based on the noise signal, that the reader connection signal includes a card information signal; determine, based on the noise signal and the reader connection signal, the card information signal; and provide the card information signal to a transaction processing component of the transaction device to permit the transaction processing component to process a transaction based on the card information signal.

According to some implementations, a transaction device may include a transaction processing component configured to process a transaction associated with a transaction card; a magnetic reader element configured to generate a card information signal based on sensing a magnetic field associated with the transaction card; and a card reader control component communicatively coupled to the magnetic reader element via a reader connection, the card reader control component configured to: transmit a noise signal through the reader connection; monitor a reader connection signal associated with the reader connection to detect the card information signal within the reader connection, wherein the noise signal is configured to obfuscate the card information signal in the reader connection; determine that the reader connection signal includes the card information signal based on the reader connection signal being different from the noise signal; process the reader connection signal to determine the card information signal; and provide the card information signal to the transaction processing component to permit the transaction processing component to process the transaction.

DETAILED DESCRIPTION

The following detailed description of example implementations refers to the accompanying drawings. The same reference numbers in different drawings may identify the same or similar elements.

A user of a transaction device may insert a transaction card into the transaction device to initiate and/or perform a transaction via the transaction card and the transaction device. The transaction card may include a magnetic element, such as a magnetic strip, that produces a magnetic field. When a magnetic reader element of the transaction device senses the magnetic field, the magnetic reader element converts the magnetic field into a card information signal. The card information signal may include and/or carry unencrypted card information associated with the transaction card, such as transaction card identification information (e.g., an account identifier, a cardholder identifier, an expiration date, a verification number, and/or the like), account information, financial institution information, card association information, and/or the like. In some instances, an unauthorized user (e.g., a fraudulent individual) may attempt to obtain the unencrypted card information from the transaction card using a skimming device. Such a skimming device may read the magnetic strip of the transaction card (e.g., in a similar manner as the magnetic reader element) when the transaction card is inserted into the transaction device and/or passed by the skimming device, which could be masked as a component of the transaction device. To prevent such unlawful activity, a wireless jamming signal may be transmitted to obfuscate the card information when the skimming device is externally mounted on the transaction device (e.g., by altering the magnetic field associated with the transaction card) and/or when the skimming device is not communicatively coupled with the card reader device of the transaction device.

However, in some instances, an unauthorized user may use a skimming device that taps into circuitry of a card reader device of the transaction device to electronically and/or communicatively couple the skimming device to the card reader device to obtain (i.e., steal) sensitive card information from the transaction card, rendering the above mentioned wireless jamming signal useless. For example, the unauthorized user may connect a lead or wire to a connection of the magnetic reader element of the card reader device (e.g., by physically drilling through a housing of the transaction device or breaching the transaction device in some other manner to tap into the circuitry) to read a card information signal generated by the magnetic card reader element when the transaction card is interacted with (e.g., swiped and/or passed by) the magnetic reader element of the card reader device.

According to some implementations described herein, a card reader device may transmit a noise signal through circuitry of the card reader device to obfuscate a card information signal that includes sensitive card information associated with a transaction card. In some implementations, the card reader device may transmit the noise signal through a reader connection (e.g., a magnetic reader element connection), receive a reader connection signal that includes the noise signal, extract the card information signal, associated with a transaction card, from the reader connection signal based on the noise signal, and perform an action associated with the card information signal (e.g., provide card information and/or the card information signal to a control component of the transaction device to permit the transaction device to initiate and/or process the transaction). In this way, any unauthorized user that taps into the connection of the reader element obtains a signal that obfuscates the card information signal using the noise signal. Accordingly, because the unauthorized user does not have access to the noise signal (i.e., the noise signal is unknown to the unauthorized user), the unauthorized user cannot discern and/or separate the card information signal from the noise signal. Therefore, the card reader device, as described herein, may obfuscate card information (e.g. unencrypted card information) that is obtained from a transaction card via a card read head (e.g., a magnetic reader element, a chip reader element, and/or the like) of a card reader device of a transaction device.

Accordingly, the card reader device and/or one or more processes described herein may prevent fraud associated with a fraudulent individual unlawfully obtaining sensitive card information (e.g., from an unencrypted card information signal) by tapping into circuitry of a transaction device, such as circuitry of a card reader device of the transaction device. Therefore, the card reader device, as described herein, may conserve any computing resources (e.g., processing resources, memory resources, power resources, and/or the like) and/or network resources involved in correcting and/or accounting for any fraudulent activity that would have otherwise occurred without the use of the card reader device as described herein.

Figure 1A:
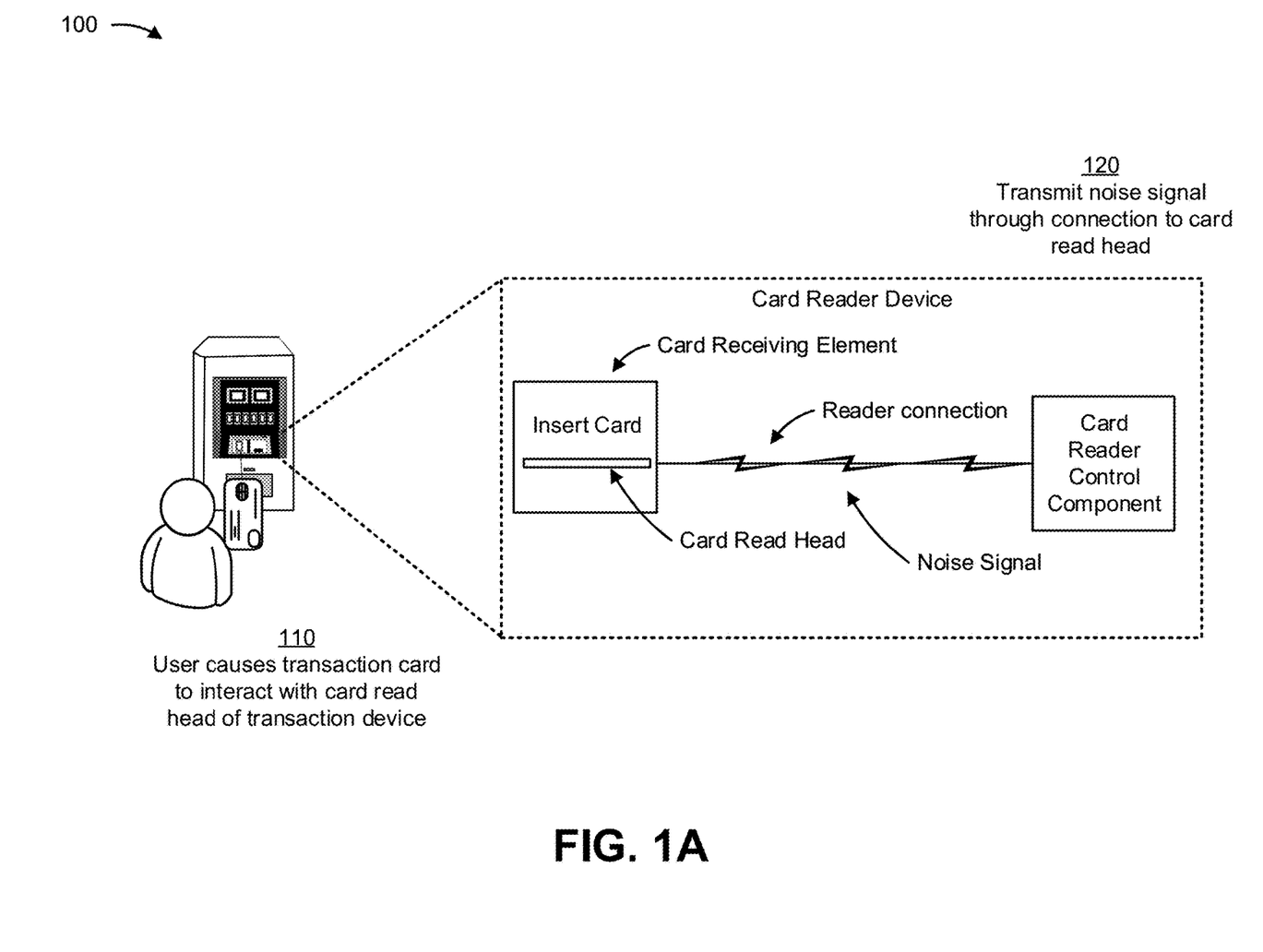
FIGS. 1A and 1B are diagrams of an example implementation described herein.
Figure 1B:
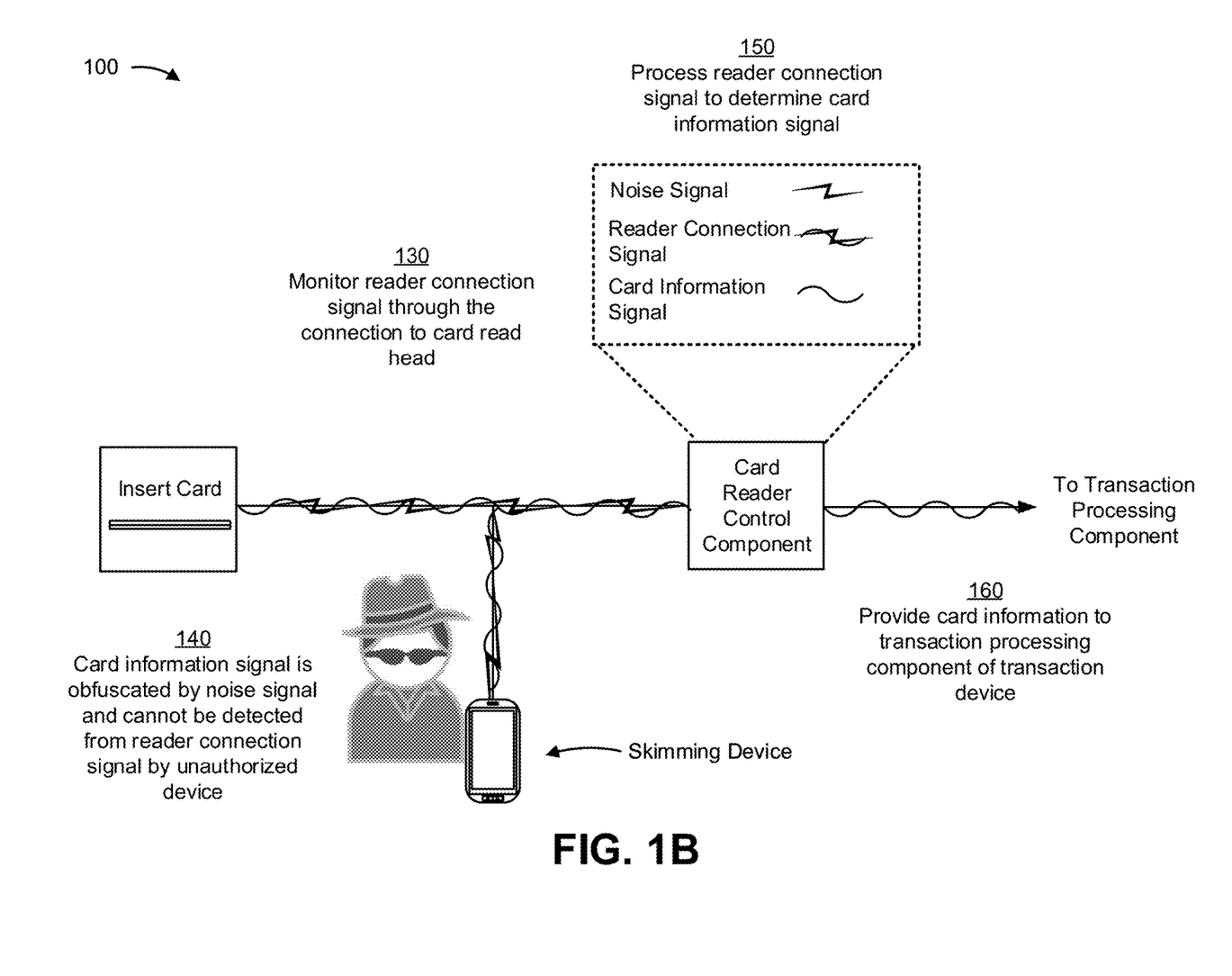

FIGS. 1A and 1B are diagrams of an example implementation 100 described herein. Example implementation 100 includes, in FIG. 1A, a transaction card being inserted into a transaction device. The transaction device includes a card receiving element, a card read head, and a card reader control component. Example implementation 100 further includes, in FIG. 1B, an unauthorized device communicatively coupled with circuitry of the card reader device (e.g., with a read connection associated with the card read head) that may be attempting to obtain card information associated with the transaction card.

As shown in FIG. 1A, and by reference number 110, a user causes a transaction card to interact with a card read head of a transaction device. For example, the user may insert the transaction card into a card receiving element of the transaction device. In some implementations, the user may insert the transaction card into the card receiving element through a card slot, a card feeder, a card prereader, and/or the like. Additionally, or alternatively, the user may swipe the transaction card through a card slot that includes the card read head.

In this way, the user may cause the transaction card to interact with the card read head of the card reader device to permit the transaction device to receive card information associated with the transaction card and/or permit a transaction associated with the transaction to be processed.

As further shown in FIG. 1A, and by reference number 120, the card reader device may transmit a noise signal through a connection to the card read head (which may be referred to herein as a "reader connection"). For example, a card reader control component may transmit the noise signal through the connection to obfuscate card information associated with the transaction card (e.g., to prevent an unauthorized device from obtaining the card information from the transaction card and/or the card reader device).

As described herein, the noise signal may be any signal that is known to the card reader device but unknown to any unauthorized device that may be communicatively coupled with the card reader device (e.g., such as a user device of a fraudulent user). The noise signal may be any type of analog signal and/or digital signal that is transmitted through the reader connection using any suitable technique. The noise signal may be known to the card reader device and/or the transaction device based on the card reader device generating the noise signal. In some implementations, the noise signal is comprised of one or more signals having various durations, frequencies, and/or the like.

The card reader device may generate the noise signal to be a signal that prevents an unauthorized device from obtaining card information associated with the transaction card. For example, the card reader device may generate the noise signal to obfuscate a card information signal that is generated by the card read head when the transaction card interacts with the card read head. In some implementations, the noise signal may be randomly generated. For example, the card reader control component may generate the noise signal using any suitable randomization technique or device, such as a random number generator, a random code generator (e.g., a code generator that uses one or more random parameters (e.g., timing parameters, location parameters, user parameters, and/or the like) that may have various and/or random values), and/or the like. Additionally, or alternatively, the card reader device may use one or more predetermined noise signals (e.g., that are stored in a memory of the card reader device) associated with the card reader device.

In some implementations, the card reader device may change and/or alter one or more characteristics (e.g., amplitude, frequency, phase, and/or the like) of the noise signal. For example, the card reader device may transmit the noise signal with hundreds, thousands, millions or more different combinations of the characteristics during a particular time period to prevent a skimming device from obtaining and/or learning the noise signal and/or characteristics of the noise signal (e.g., before the user inserts the transaction card). In this way, the skimming device and/or an unauthorized user cannot possibly determine the noise signal (and/or a pattern of the characteristics of the noise signal).

In some implementations, the card reader control component continuously transmits the noise signal through the connection (e.g., including before the transaction card is inserted into the card receiving element). Accordingly, the card reader control component may transmit the noise signal through the connection regardless of whether a transaction card recently interacted with the card read head. Additionally, or alternatively, card reader control component transmits the noise signal through the connection based on the card receiving element receiving the transaction card and/or detecting that an object (e.g., the transaction card) has been inserted into the card receiving element. For example, card reader control component may transmit the noise signal through the reader connection based on the card receiving element receiving the transaction card through a card slot or other component of the card receiving element.

Additionally, or alternatively, the card reader control component may change which noise signal (or which characteristics of the noise signal) is transmitted through the reader connection based on detecting that the transaction card interacted with the card read head. For example, before the card receiving element received the transaction card, the card reader control component may transmit a standby signal that is different from the noise signal. The standby signal may be generated and/or transmitted as a dummy noise signal that has different characteristics than the noise signal used to obfuscate the card information signal. In this way, if an unauthorized user attempts to obtain, via a skimming device tapped into the reader connection, the noise signal before the transaction card interacts with the card read head, the unauthorized user may only obtain the standby noise signal, rather than the noise signal used to obfuscate the card information signal.

In this way, the card reader device (e.g., via the card reader control component) may transmit a noise signal through the reader connection to obfuscate a card information signal generated by the card read head based on the transaction card interacting with the card read head.

As shown in FIG. 1B, and by reference number 130, the card reader device monitors a reader connection signal through the connection to the card read head. For example, the card reader device may monitor the reader connection signal to determine whether the reader connection signal includes a card information signal (e.g., based on the card read head interacting with the transaction card). Accordingly, the reader connection signal may include the noise signal and the card information signal.

As described herein, the card reader control component may determine that the reader connection signal includes a card information signal based on the reader connection signal being different from the noise signal. For example, the card reader device may store the noise signal that was transmitted to obfuscate a card information signal (e.g., a portion of the noise signal that was transmitted within a most recent threshold time period) to enable the card reader control component to refer to the noise signal when monitoring the reader connection for the card information signal. In this way, the card reader control component may compare the reader connection signal with the noise signal to determine whether the reader connection signal is different from the noise signal. If the reader connection signal and the noise signal are the same (or substantially the same), the card reader control component may determine that the reader connection signal does not include a card information signal. On the other hand, if the reader connection signal is different from the noise signal (or there is a threshold difference between the reader connection signal and the noise signal), the card reader control component may determine that the transaction card was inserted and/or determine that the reader connection signal includes a card information signal. The card reader control component may use any suitable signal processing technique(s) to compare the reader connection signal and the transmitted noise signal, such as a signature analysis, a sliding window analysis, a variance analysis, and/or the like.

As described herein, the card information signal may be generated and/or transmitted from the card receiving element and/or card read head based on the user causing the transaction card to interact with the card read head of the transaction device (e.g., by inserting the transaction card in the card receiving element). The card information signal may carry card information associated with the transaction card, an account of the transaction card, and/or a user associated with the transaction card. The card information may include an identification number of the transaction card, information identifying an expiration of the transaction card, information identifying a verification number of the transaction card, information identifying a user associated with the transaction card, and/or the like.

In this way, the card reader control component may monitor the reader connection to obtain a reader connection signal and determine, from the reader connection signal, whether the card read head has provided a card information signal (e.g., based on an interaction between the transaction card and the card read head).

As further shown in FIG. 1B, and by reference number 140, the card information signal is obfuscated by the noise signal and cannot be detected from a reader connection signal by the unauthorized device. In example implementation 100, an unauthorized user has tapped into the reader connection using a skimming device. As shown, because the noise signal is being transmitted through the reader connection, the card information signal is obfuscated by the noise signal. Furthermore, because the unauthorized user and/or the skimming device does not know or have access to the characteristics of the noise signal (e.g., due to not having access to processes and/or methods used by the card reader control component to generate and/or transmit the noise signal), the unauthorized user and/or skimming device are unable to obtain (i.e., steal) the card information from the card information signal.

In this way, the card reader device is capable of obfuscating the card information signal to prevent the unauthorized user from obtaining the card information associated with the transaction card and/or from engaging in any subsequent fraudulent activity (e.g., engage in unlawful purchases) using the card information.

As further shown in FIG. 1B, and by reference number 150, the card reader device processes the reader connection signal to determine a card information signal. For example, the card reader control component may remove the noise signal from the reader connection signal to determine a card information signal. The card reader control component may use any suitable signal processing techniques to process the reader connection signal and remove the noise signal from the reader connection signal to determine the card information signal. As described above, the card reader control component may compare the reader connection signal and the noise signal. Furthermore, to obtain the card information signal, the card reader control component may subtract the noise signal from the reader connection signal to determine the card information signal. In some implementations, the card reader control component may generate the card information signal (or re-generate the card information signal, relative to the card read head previously generating the card information signal) from the reader connection signal by removing the noise signal from the reader connection signal.

In this way, the card reader device may extract the obfuscated card information signal from the reader connection signal to permit the card reader device to provide the card information signal and/or card information associated with the transaction card to a transaction processing component of the transaction device.

As further shown in FIG. 1B, and by reference number 160, the card reader device provides the card information to a transaction processing component of the transaction device. For example, the card reader control component may process the card information signal to determine the card information. In such cases, the card reader control component may forward the card information to the transaction processing component as data that identifies the card information. In some implementations, the card reader control component may forward the card information signal to the transaction device to enable the transaction device to determine the card information from the card information signal.

In some implementations, the card reader control component may encrypt the card information and/or card information signal, using any suitable encryption technique. For example, before forwarding the card information to the transaction processing component, the card reader control component may encrypt the card information, may encrypt the card information via an encrypted signal that is transmitted to the transaction processing component, convert the card information signal into an encrypted card information signal (using an encryption technique), and/or the like. In this way, the card reader control component may prevent an unauthorized user from obtaining the card information by tapping into a connection between the card reader device and the transaction processing component of the transaction device.

In this way, the card reader device may extract obfuscated card information from the reader connection and provide card information associated with the transaction card to the transaction processing component of the transaction device to permit the transaction device to initiate and/or process a transaction using the card information. The transaction processing component may use the card information to process a transaction associated with the transaction card.

Accordingly, as described herein, when a transaction card is inserted into a card reader device, the card reader device may obfuscate an unencrypted card information signal by transmitting noise through circuitry of the reader device (e.g., through a reader connection between a card read head and a control component of the card reader device). Therefore, using the methods, processes, and/or card reader device, described herein, an unauthorized device (and/or unauthorized user) is prevented from gaining fraudulent access to card information associated with the transaction card and/or further engaging in unlawful activity using the card information.

As indicated above, FIGS. 1A and 1B are provided merely as an example. Other examples may differ from what was described with regard to FIGS. 1A and 1B.

Figure 2:
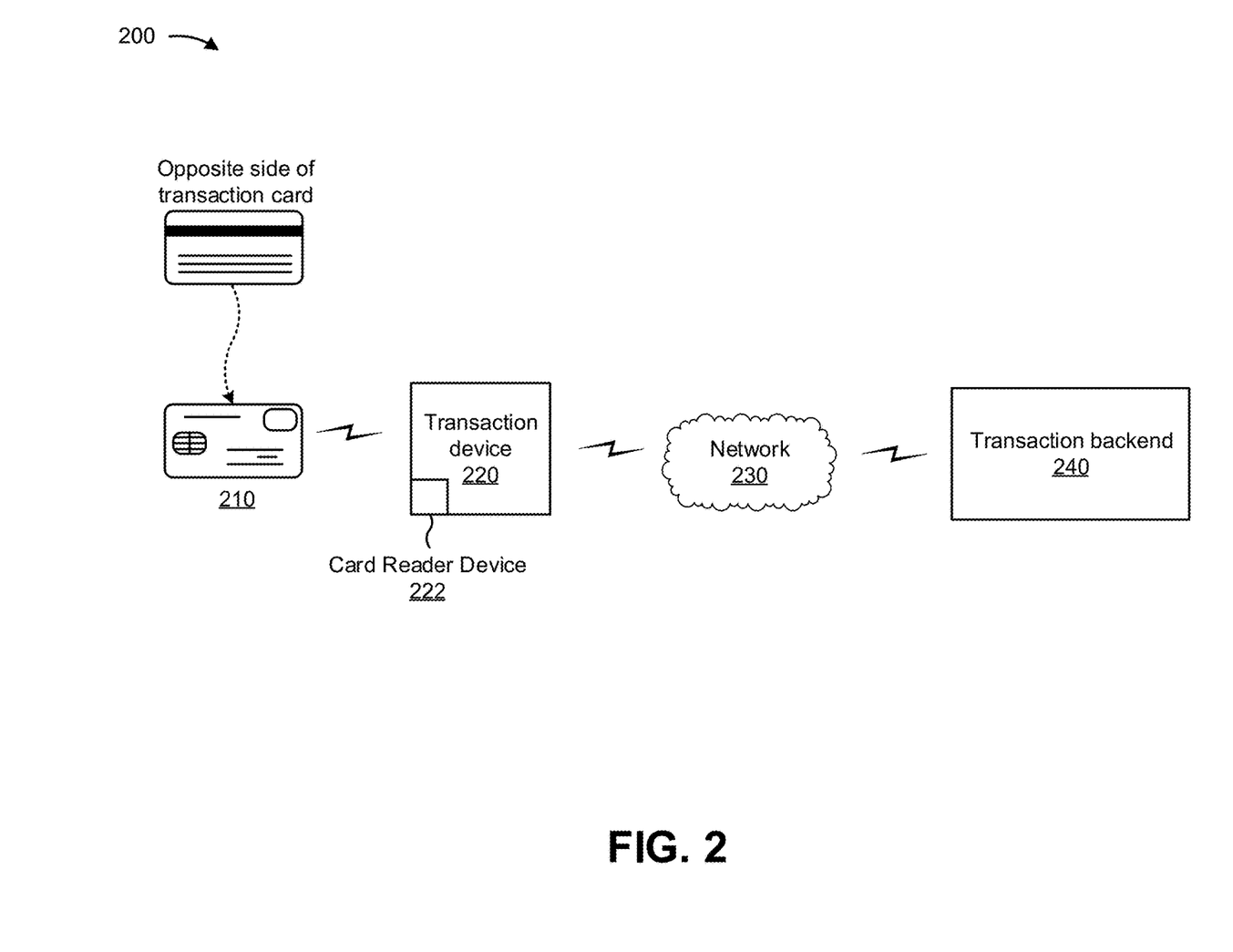
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a transaction card 210, a transaction device 220 with a card reader device 222, a network 230, and a transaction backend 240. Devices of environment 200 may interconnect via wired connections, wireless connections, or a combination of wired and wireless connections.

Transaction card 210 includes a transaction card capable of communicating with transaction device 220. In some implementations, transaction card 210 may be a smart transaction card that is capable of communicating with other devices of environment 200 (e.g., via Bluetooth communication, BLE communication, Wi-Fi communication, a near field communication (NFC) session, and/or the like). Transaction card 210 is capable of communicating data for a transaction with transaction device 220. For example, transaction card 210 may provide, transaction device 220 card information that includes a transaction token, transaction card identification information (e.g., an account identifier, a cardholder identifier, and/or the like), account information, banking information, and/or the like. For example, transaction card 210 may include a magnetic strip and/or an integrated circuit (IC) chip (e.g., a EUROPAY®, MASTERCARD®, VISA® (EMV) chip) that provides the card information to transaction device 220 via an interaction with transaction device 220. Such an interaction may include transaction card 210 being swiped through a magnetic card reader element of transaction device 220, being inserted into transaction device 220 (e.g., into a card reader device of transaction device 220) such that the IC is aligned or in contact with a chip reader of transaction device 220, and/or the like. Transaction card 210 may include a radio frequency (RF) antenna to communicate (e.g., via NFC) card information associated with transaction card 210. The RF antenna may be a passive RF antenna, an active RF antenna, and/or a battery-assisted RF antenna.

Transaction device 220 includes one or more devices capable of receiving, generating, storing, processing, and/or providing information, such as information described herein. For example, transaction device 220 may include an automated teller machine (ATM) device, a point of sale (POS) device, a kiosk device, and/or the like. An ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. A POS device may include an electronic device used to process transaction card payments at retail locations. The POS device may read information from a transaction card (e.g., a credit card, a debit card, a gift card, and/or the like), and may determine whether there are sufficient funds in an account associated with the transaction card for a transaction. The POS device may transfer funds from the account associated with the transaction card to an account of a retailer and may record the transaction. A kiosk device may include a computer terminal featuring specialized hardware and software that provides access to information and/or applications for communication, commerce, entertainment, education, and/or the like.

Transaction device 220 may include a transaction processing component to process and/or enable a transaction to be processed using card information associated with transaction card 210. Transaction device 220 may include card reader device 222 to receive the card information from transaction card 210. The card information received, by card reader device 222, from transaction card 210 may be received in a card information signal that is unprocessed and/or unencrypted. Card reader device 222 may receive and/or process the card information signal via a card receiving element, a magnetic reader element, a chip reader element, a control component, and/or the like. Accordingly, card reader device 222 may include one or more components and/or circuitry that may obtain a signal that includes unencrypted card information from transaction card 210 when transaction card 210 is inserted into card reader device 222 of transaction device 220.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Transaction backend 240 includes one or more devices capable of authorizing and/or facilitating a transaction. For example, transaction backend 240 may include one or more servers and/or computers to store and/or provide information (e.g., authorizations, balances, transaction tokens, security information, account information, and/or the like) associated with processing a transaction via transaction device 220.

Transaction backend 240 may include one or more devices associated with financial institutions (e.g., banks, credit unions, and/or the like) and/or transaction card associations that authorize the transaction and/or facilitate a transfer of funds or payments between an account of a cardholder of a transaction card (e.g., transaction card 210) and an account of an individual or business of transaction device 220. For example, transaction backend 240 may include one or more devices of one or more issuing financial institutions associated with a cardholder of transaction card 210, one or more devices of one or more acquiring financial institutions (or merchant banks) associated with transaction device 220, and/or one or more devices associated with one or more card associations (e.g., VISA®, MASTERCARD®, and/or the like) associated with transaction card 210. Accordingly, based on receiving transaction card data associated with transaction card 210 from transaction device 220, various financial institutions and/or card associations of transaction backend 240 may communicate to authorize the transaction and/or transfer funds between the accounts associated with transaction card 210 and/or transaction device 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
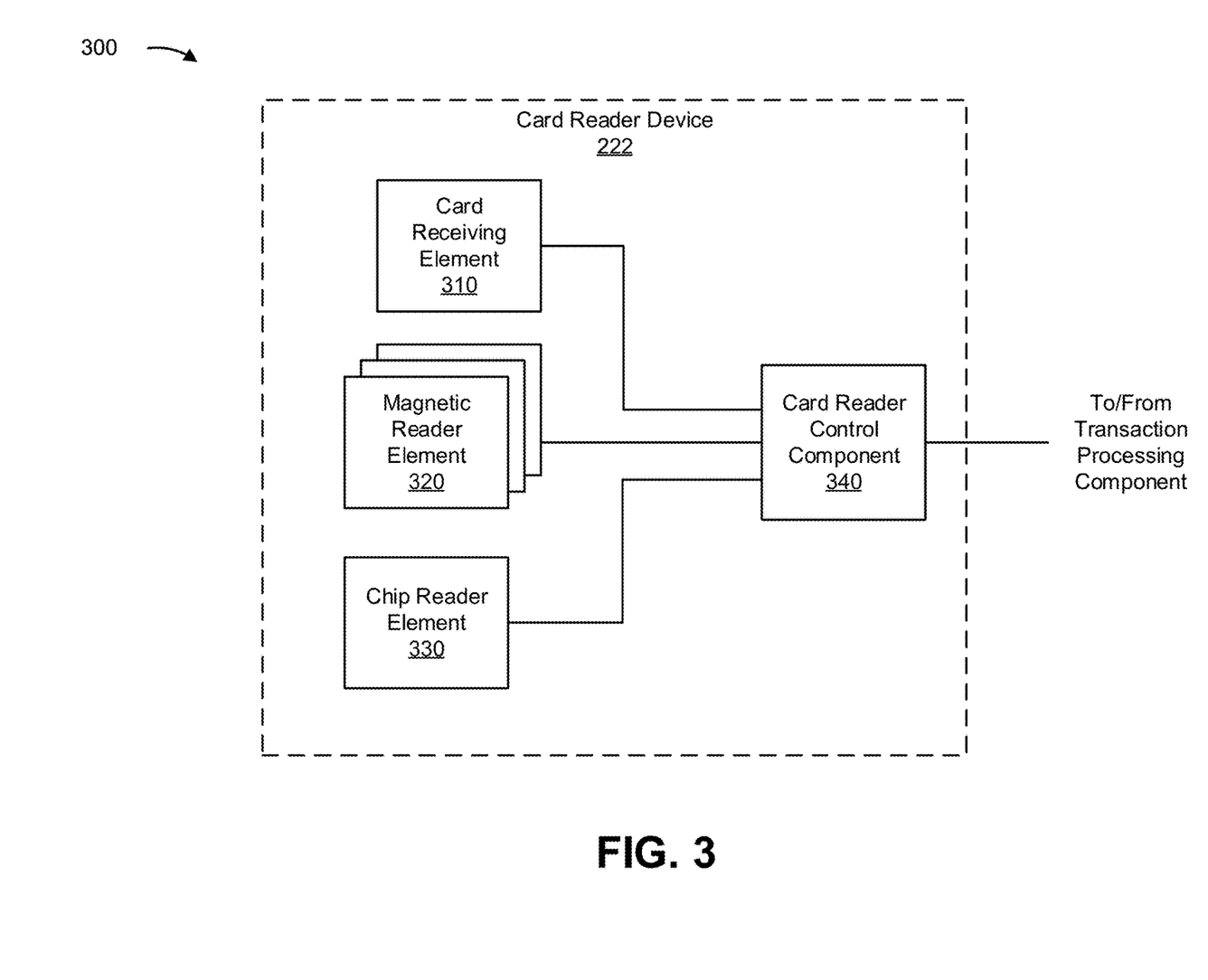
FIG. 3 is a diagram of an example card reader device of FIG. 2.

FIG. 3 is a diagram of example components of a device 300. Device 300 may correspond to card reader device 222. In some implementations, card reader device 222 may include one or more devices 300 and/or one or more components of device 300. As shown in FIG. 3, device 300 may include a card receiving element 310, a magnetic reader element 320, a chip reader element 330, and a card reader control component 340.

Card receiving element 310 includes one or more components that permit card reader device 222 and/or transaction device 220 to interact with transaction card 210 to obtain card information associated with transaction card 210. Card receiving element 310 may be configured to perform one or more pre-reading processes (e.g., object analysis, object detection, transaction card detection analysis, and/or the like) to verify that an object inserted into the card reader is a transaction card 210. In some implementations, card receiving element 310 may send a notification signal to card reader control component 340 to indicate that transaction card 210 was received and/or has interacted with transaction device 220.

Magnetic reader element 320 includes one or components that permit card reader device 222 to read a magnetic field produced by a magnetic element (e.g., a magnetic strip) of transaction card 210. For example, magnetic reader element 320 may include a magnetic read head that, when a magnetic strip of transaction card 210 is swiped and/or passes near the magnetic read head, converts the magnetic field into a card information signal that includes card information associated with transaction card 210. Such card information may be used by transaction device 220 to initiate and/or process a transaction associated with transaction card 210. Furthermore, such card information may be unencrypted card information associated with transaction card 210 that, if obtained by an unauthorized user, can be used to engage in a transaction (e.g., using transaction device 220 and/or one or more other types of transaction devices 220). The magnetic reader element 320 may correspond to the card read head of example implementation 100.

Chip reader element 330 includes one or more components that permit card reader device 222 to interact with an IC of transaction card 210. For example, chip reader element 330 may include one or more conductive contacts that establish an electrical connection with one or more terminals of the IC to obtain card information from transaction card 210. In some implementations, chip reader element 330 may wirelessly communicate with the IC to obtain the card information. Such card information may be used by transaction device 220 to initiate and/or process a transaction associated with transaction card 210. The chip reader element 330 may correspond to the card read head of example implementation 100.

Card reader control component 340 may include one or more components (e.g., a processor, microprocessor, and/or the like) capable of receiving one or more signals from card receiving element 310, magnetic reader element 320, chip reader element 330, and determining card information associated with transaction card 210 based on the one or more signals. Card reader control component 340 may be communicatively coupled via one or more electrical connections (e.g., wires, traces, leads, and/or the like) with a transaction device control component of transaction device 220 to permit card reader control component 340 to provide the card information to the transaction device control component. In some implementations, to obfuscate unencrypted card information from transaction card 210, card reader control component 340 may transmit a noise signal through circuitry (e.g., an electrical connection between magnetic reader element 320 and card reader control component 340, an electrical connection between chip reader element 330 and card reader control component 340, and/or the like) of card reader device 222 and determine the card information signal based on the noise signal.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
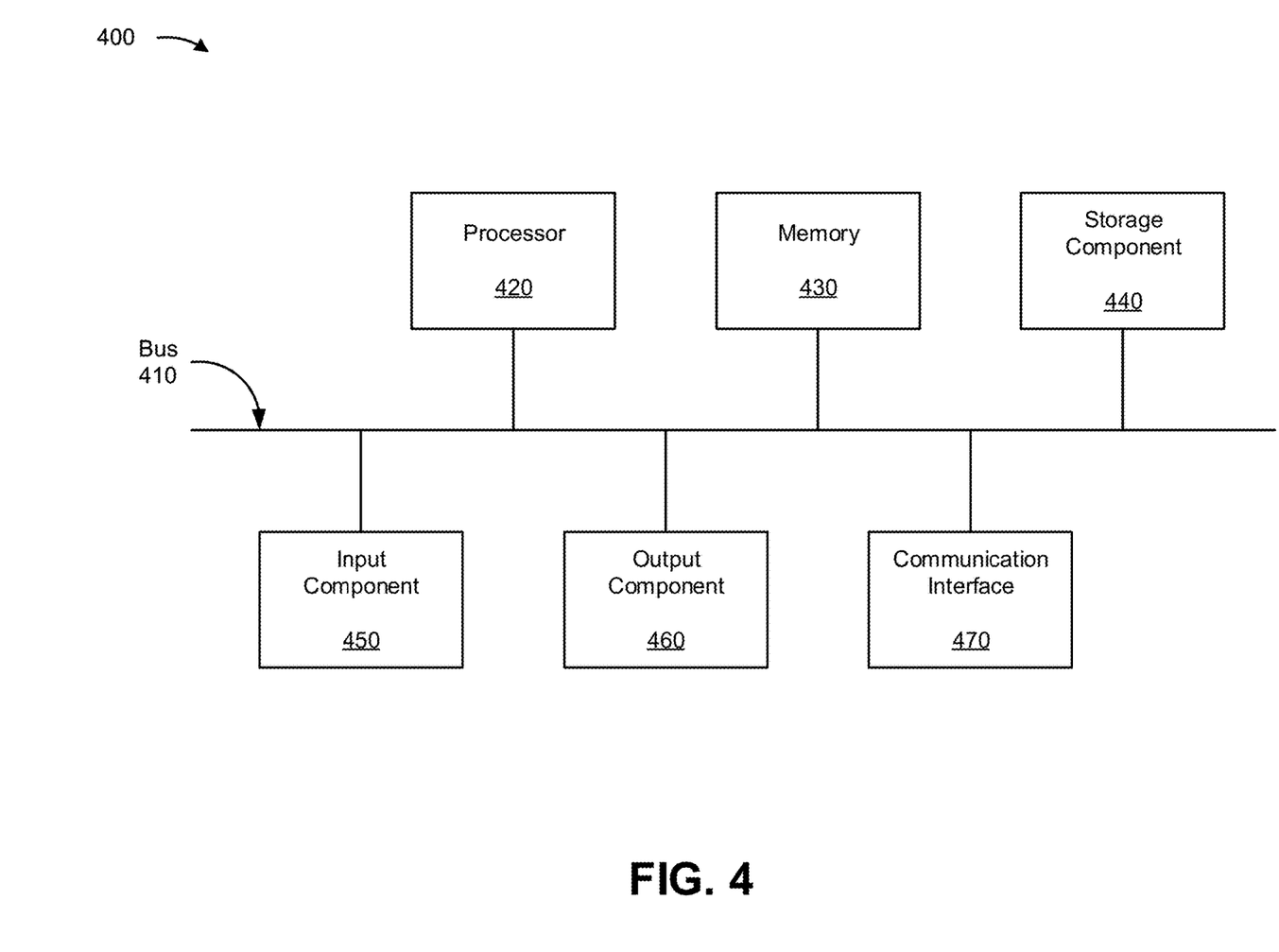
FIG. 4 is a diagram of example components of one or more devices of FIG. 2.

FIG. 4 is a diagram of example components of a device 400. Device 400 may correspond to transaction card 210, transaction device 220, card reader device 222, and/or transaction backend 240. In some implementations, transaction card 210, transaction device 220, card reader device 222, and/or transaction backend 240 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
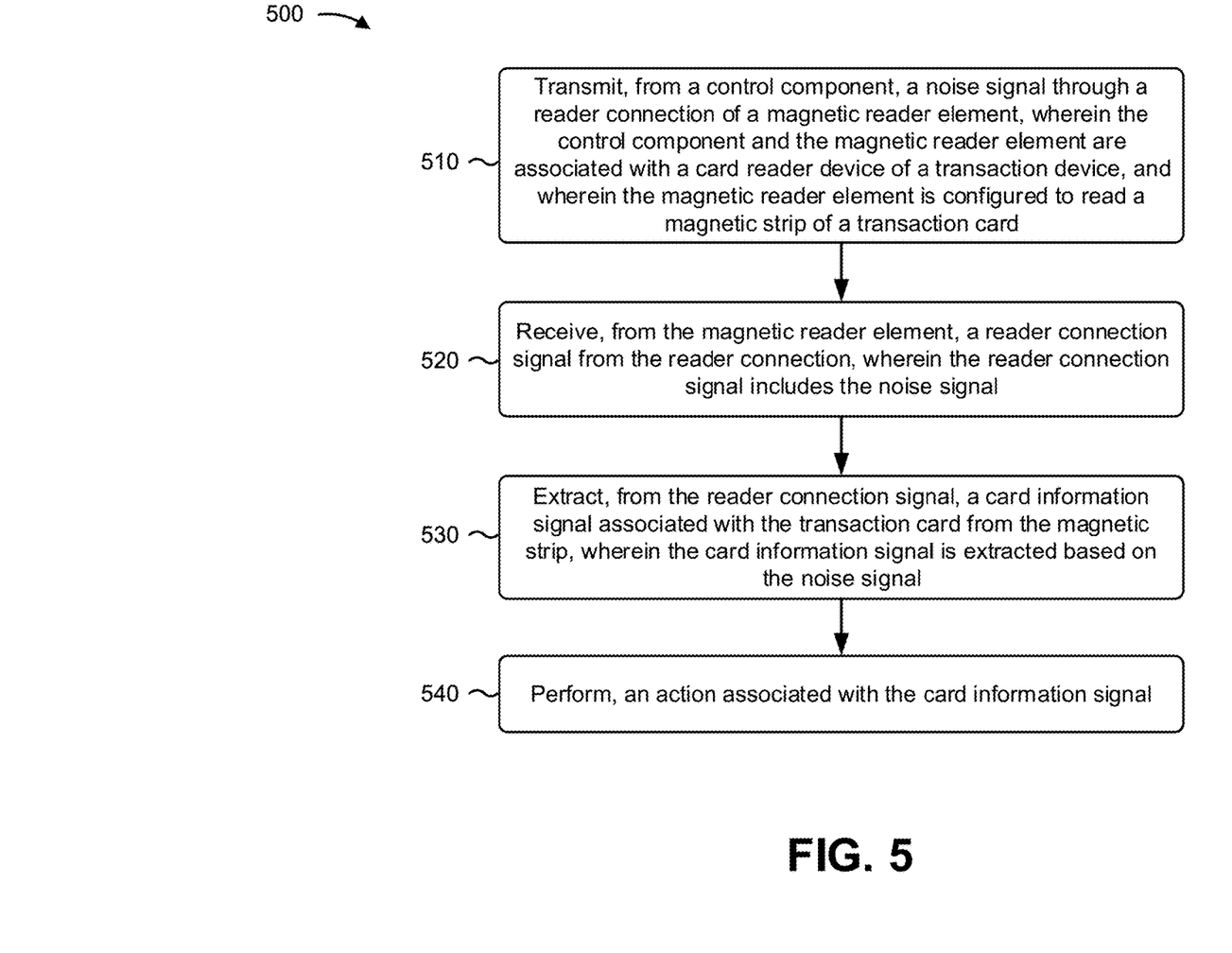
FIGS. 5-7 are flowcharts of example processes associated with obfuscation of information obtained by a card reader.

FIG. 5 is a flow chart of an example process 500 associated with obfuscation of information obtained by a card reader. In some implementations, one or more process blocks of FIG. 5 may be performed by a card reader device (e.g., card reader device 222). In some implementations, one or more process blocks of FIG. 5 may be performed by another device or a group of devices separate from or including the card reader device, such as a transaction device (e.g., transaction device 220).

As shown in FIG. 5, process 500 may include transmitting, from a control component, a noise signal through a reader connection of a magnetic reader element, wherein the control component and the magnetic reader element are associated with a card reader device of a transaction device, and wherein the magnetic reader element is configured to read a magnetic strip of a transaction card (block 510). For example, the card reader device (e.g., using a processor 420, a memory 430, a storage component 440, an output component 460, and a communication interface 470, and/or the like) may transmit a noise signal through a reader connection of a magnetic reader element, as described above. In some implementations, a control component and the magnetic reader element are associated with the card reader device of the transaction device. In some implementations, the magnetic reader element is configured to read a magnetic strip of a transaction card.

As further shown in FIG. 5, process 500 may include receiving, from the magnetic reader element, a reader connection signal from the reader connection, wherein the reader connection signal includes the noise signal (block 520). For example, the card reader device (e.g., using a processor 420, a memory 430, a storage component 440, an input component 450, and a communication interface 470, and/or the like) may receive, from the magnetic reader element, a reader connection signal from the reader connection, as described above. In some implementations, the reader connection signal includes the noise signal.

As further shown in FIG. 5, process 500 may include extracting, from the reader connection signal, a card information signal associated with the transaction card from the magnetic strip, wherein the card information signal is extracted based on the noise signal (block 530). For example, the card reader device (e.g., using a processor 420, a memory 430, a storage component 440, an input component 450, and a communication interface 470, and/or the like) may extract, from the reader connection signal, a card information signal associated with the transaction card from the magnetic strip, as described above. In some implementations, the card information signal is extracted based on the noise signal.

As further shown in FIG. 5, process 500 may include performing, an action associated with the card information signal (block 540). For example, the card reader device (e.g., using a processor 420, a memory 430, a storage component 440, an output component 460, and a communication interface 470, and/or the like) may perform, an action associated with the card information signal, as described above.

Process 500 may include additional aspects, such as any single aspect or any combination of aspects described below and/or in connection with one or more other processes described elsewhere herein.

In some implementations, the card reader device may determine that the transaction card was received by a card receiving device of the transaction device. In some implementations, the noise signal is transmitted based on determining that the transaction card was received by the card receiving device. In some implementations, the noise signal obfuscates the card information signal to prevent an unauthorized device from obtaining the card information signal via the reader connection signal.

In some implementations, the card reader device, when extracting the card information signal, may compare the reader connection signal and the noise signal and subtract the noise signal from the reader connection signal to generate the card information signal. In some implementations, the card information signal carries card information associated with the transaction card. In some implementations, the card information associated with the transaction card includes at least one of: an identification number of the transaction card, information identifying an expiration of the transaction card, information identifying a verification number of the transaction card, or information identifying a user associated with the transaction card.

In some implementations, the noise signal is a randomly generated noise signal. In some implementations, the card reader device, when performing the action, may encrypt the card information signal and/or forward the card information signal to a transaction processing component of the transaction device to permit the transaction processing component to process a transaction associated with the transaction card.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
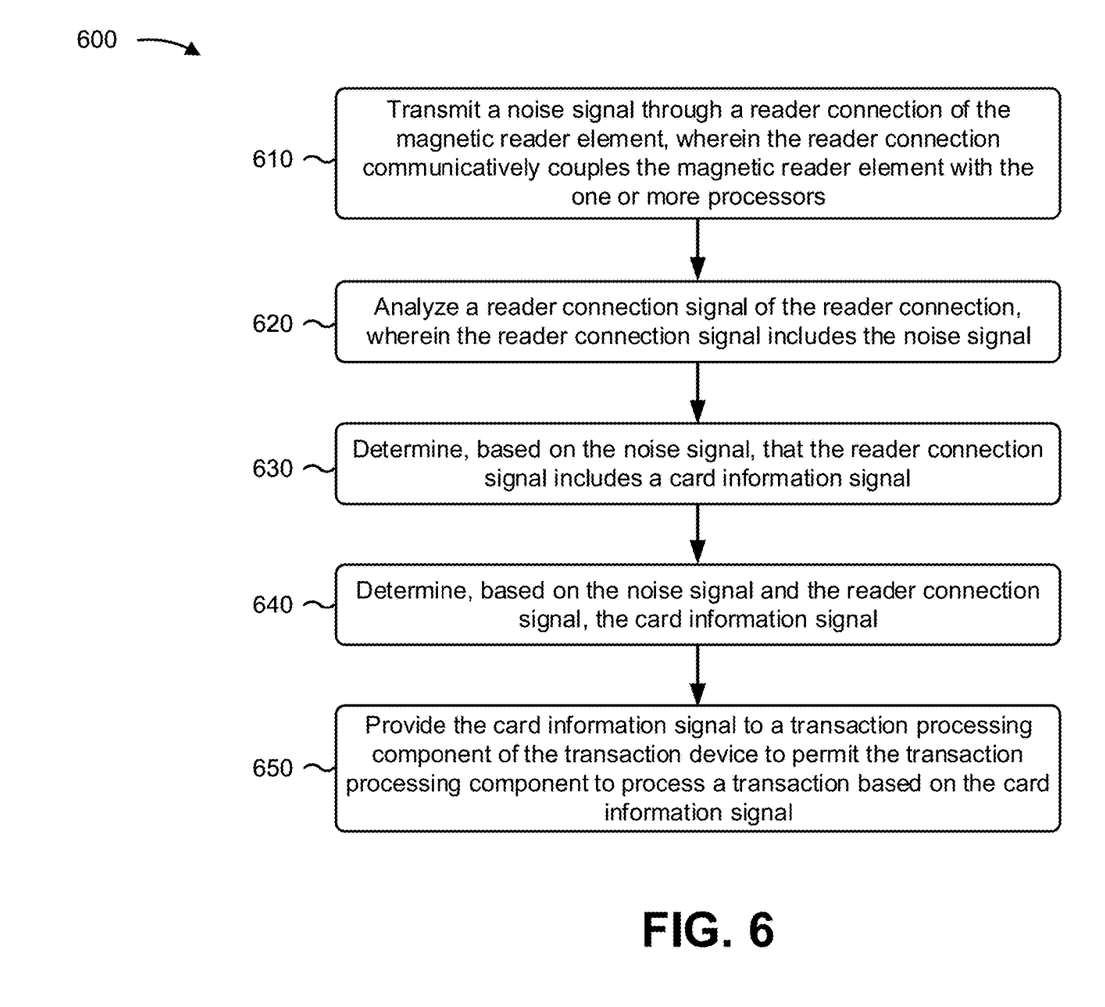

FIG. 6 is a flow chart of an example process 600 associated with obfuscation of information obtained by a card reader. In some implementations, one or more process blocks of FIG. 6 may be performed by a card reader device (e.g., card reader device 222). In some implementations, one or more process blocks of FIG. 6 may be performed by another device or a group of devices separate from or including the card reader device, such as a transaction device (e.g., transaction device 220).

As shown in FIG. 6, process 600 may include transmitting a noise signal through a reader connection of a magnetic reader element, wherein the reader connection communicatively couples the magnetic reader element with the one or more processors (block 610). For example, the card reader device (e.g., using a processor 420, a memory 430, a storage component 440, an output component 460, and a communication interface 470, and/or the like) may transmit a noise signal through a reader connection of the magnetic reader element, as described above. In some implementations, the reader connection communicatively couples the magnetic reader element with the one or more processors. In some implementations, the magnetic reader element is configured to read a magnetic strip of a transaction card.

As further shown in FIG. 6, process 600 may include analyzing a reader connection signal of the reader connection, wherein the reader connection signal includes the noise signal (block 620). For example, the card reader device (e.g., using a processor 420, a memory 430, a storage component 440, an input component 450, and a communication interface 470, and/or the like) may analyze a reader connection signal of the reader connection, as described above. In some implementations, the reader connection signal includes the noise signal.

As further shown in FIG. 6, process 600 may include determining, based on the noise signal, that the reader connection signal includes a card information signal (block 630). For example, the card reader device (e.g., using a processor 420, a memory 430, a storage component 440, an input component 450, and a communication interface 470, and/or the like) may determining, based on the noise signal, that the reader connection signal includes a card information signal, as described above.

As further shown in FIG. 6, process 600 may include determining, based on the noise signal and the reader connection signal, the card information signal (block 640). For example, the card reader device (e.g., using a processor 420, a memory 430, a storage component 440, an input component 450, and a communication interface 470, and/or the like) may determining, based on the noise signal and the reader connection signal, the card information signal, as described above.

As further shown in FIG. 6, process 600 may include providing the card information signal to a transaction processing component of the transaction device to permit the transaction processing component to process a transaction based on the card information signal (block 650). For example, the card reader device (e.g., using a processor 420, a memory 430, a storage component 440, an output component 460, and a communication interface 470, and/or the like) may providing the card information signal to a transaction processing component of the transaction device to permit the transaction processing component to process a transaction based on the card information signal, as described above.

Process 600 may include additional aspects, such as any single aspect or any combination of aspects described below and/or in connection with one or more other processes described elsewhere herein.

In some implementations, the card reader device may generate the noise signal and store the noise signal in the memory. In some implementations, the card reader device, when determining the card information signal, may determine that the card information signal by subtracting the stored noise signal from the reader connection signal.

In some implementations, the card reader device, when determining that the reader connection signal includes the card information signal, may compare the reader connection signal and the noise signal, determine that the reader connection signal and the noise signal are different, and determine, based on the reader connection signal and the noise signal being different from one another, that the reader connection signal includes the card information signal.

In some implementations, the card information signal is generated by the magnetic reader element sensing a magnetic field associated with the transaction card. In some implementations, the card reader device, when determining the card information signal, may extract the card information signal from the reader connection signal by subtracting the noise signal from the reader connection signal.

In some implementations, the card reader device may include a card receiving element configured to perform a prereading process to verify that the transaction card can be used for the transaction. In some implementations, the card reader device may determine that the card receiving element received the transaction card. In some implementations, the noise signal is transmitted based on determining that the card receiving element received the transaction card. In some implementations, the card reader device, before the card receiving element received the transaction card, may transmit a standby signal that is different from the noise signal.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
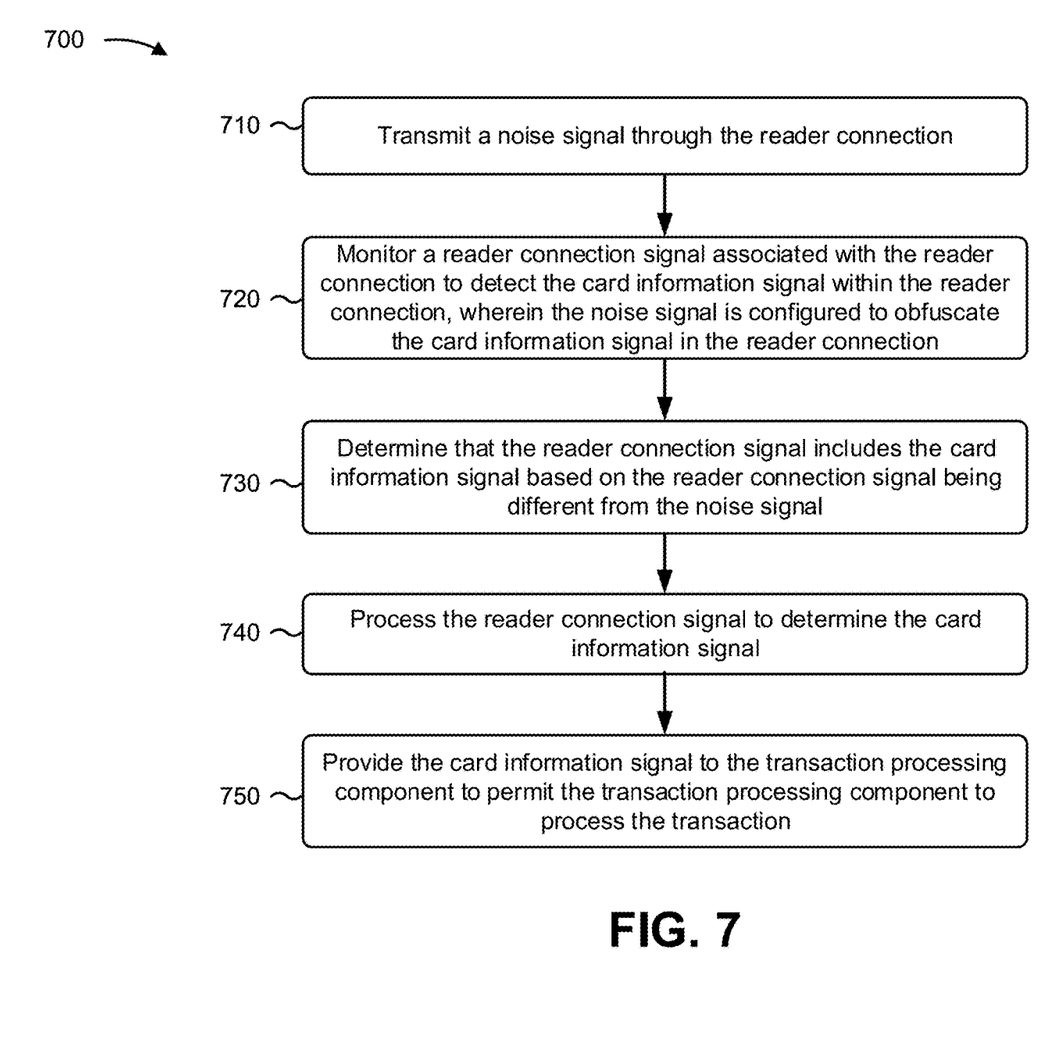

FIG. 7 is a flow chart of an example process 700 associated with obfuscation of information obtained by a card reader. In some implementations, one or more process blocks of FIG. 7 may be performed by a card reader device (e.g., card reader device 222). In some implementations, one or more process blocks of FIG. 7 may be performed by another device or a group of devices separate from or including the card reader device, such as a transaction device (e.g., transaction device 220).

As shown in FIG. 7, process 700 may include transmitting a noise signal through a reader connection (block 710). For example, the card reader device (e.g., using a processor 420, a memory 430, a storage component 440, an output component 460, and a communication interface 470, and/or the like) may transmit a noise signal through the reader connection, as described above. In some implementations, the card reader device is communicatively coupled to a magnetic reader element via the reader connection.

As further shown in FIG. 7, process 700 may include monitoring a reader connection signal associated with the reader connection to detect a card information signal within the reader connection, wherein the noise signal is configured to obfuscate the card information signal in the reader connection (block 720). For example, the card reader device (e.g., using a processor 420, a memory 430, a storage component 440, an input component 450, and a communication interface 470, and/or the like) may monitor a reader connection signal associated with the reader connection to detect the card information signal within the reader connection, as described above. In some implementations, the noise signal is configured to obfuscate the card information signal in the reader connection. In some implementations, the magnetic reader element is configured to generate the card information signal based on sensing a magnetic field associated with a transaction card.

As shown in FIG. 7, process 700 may include determining that the reader connection signal includes the card information signal based on the reader connection signal being different from the noise signal (block 730). For example, the card reader device (e.g., using a processor 420, a memory 430, a storage component 440, an input component 450, and a communication interface 470, and/or the like) may determine that the reader connection signal includes the card information signal based on the reader connection signal being different from the noise signal, as described above.

As shown in FIG. 7, process 700 may include processing the reader connection signal to determine the card information signal (block 740). For example, the card reader device (e.g., using a processor 420, a memory 430, a storage component 440, an input component 450, and a communication interface 470, and/or the like) may process the reader connection signal to determine the card information signal, as described above.

As shown in FIG. 7, process 700 may include providing the card information signal to the transaction processing component to permit a transaction processing component to process a transaction (block 750). For example, the card reader device (e.g., using a processor 420, a memory 430, a storage component 440, an output component 460, and a communication interface 470, and/or the like) may providing the card information signal to the transaction processing component to permit the transaction processing component to process the transaction, as described above. In some implementations, the transaction processing component is configured to process the transaction associated with the transaction card.

Process 700 may include additional aspects, such as any single aspect or any combination of aspects described below and/or in connection with one or more other processes described elsewhere herein.

In some implementations, the card reader device may generate the noise signal to be a signal that prevents an unauthorized device from obtaining the card information signal from the reader connection signal. In some implementations, a card receiving element may be configured to receive the transaction card through a card slot of the transaction device. In some implementations, the noise signal is transmitted through the reader connection based on the card receiving element receiving the transaction card through the card slot. In some implementations, the card information signal carries card information associated with the transaction card. In some implementations, the transaction processing component uses the card information to process the transaction.

In some implementations, the card reader device, when processing the reader connection signal, may subtract the noise signal from the reader connection signal to generate the card information signal from the reader connection signal. In some implementations, the card reader device may encrypt the card information signal to generate an encrypted card information signal. In some implementations, card information associated with the transaction card is provided to the transaction processing component via the encrypted card information signal.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   transmitting, from a control component, a standby signal through a reader connection between the control component and a magnetic reader element;
   transmitting, from the control component and after transmitting the standby signal, a noise signal through the reader connection,
      wherein the reader connection comprises an electrical connection;
      wherein the noise signal is different from the standby signal;
      wherein the control component and the magnetic reader element are associated with a card reader device of a transaction device, and
      wherein the magnetic reader element is configured to read a magnetic strip of a transaction card;
   receiving, by the control component and from the magnetic reader element, a reader connection signal through the reader connection,
      wherein the reader connection signal includes the noise signal; and
   extracting, by the control component and from the reader connection signal, a card information signal associated with the transaction card from the magnetic strip,
      wherein the card information signal is extracted based on the noise signal; and
   performing, by the control component, an action associated with the card information signal.

2. The method of claim 1, further comprising:
   determining that the transaction card was received by a card receiving device of the transaction device,
      wherein the noise signal is transmitted based on determining that the transaction card was received by the card receiving device.

3. The method of claim 1, wherein the noise signal obfuscates the card information signal to prevent an unauthorized device from obtaining the card information signal via the reader connection signal.

4. The method of claim 1, wherein extracting the card information signal comprises:
   comparing the reader connection signal and the noise signal; and
   subtracting the noise signal from the reader connection signal to generate the card information signal,
      wherein the card information signal carries card information associated with the transaction card.

5. The method of claim 4, wherein the card information associated with the transaction card includes at least one of:
   an identification number of the transaction card,
   information identifying an expiration of the transaction card,
   information identifying a verification number of the transaction card, or
   information identifying a user associated with the transaction card.

6. The method of claim 1, wherein the noise signal is a randomly generated noise signal.

7. The method of claim 1, wherein performing the action comprises at least one of:
   encrypting the card information signal, or
   forwarding the card information signal to a transaction processing component of the transaction device to permit the transaction processing component to process a transaction associated with the transaction card.

8. A card reader device for a transaction device, comprising:
   a magnetic reader element configured to read a magnetic strip of a transaction card;
   a memory; and
   one or more processors, communicatively coupled to the memory, to:
      transmit, from the one or more processors, a standby signal through a reader connection between the one or more processors and the magnetic reader element;
      transmit, from the one or more processors and after transmitting the standby signal, a noise signal through the reader connection,
         wherein the reader connection comprises an electrical connection,
         wherein the noise signal is different from the standby signal, and
         wherein the reader connection communicatively couples the magnetic reader element with the one or more processors;
      analyze a reader connection signal of the reader connection,
         wherein the reader connection signal includes the noise signal;
      determine, based on the noise signal, that the reader connection signal includes a card information signal;

determine, based on the noise signal and the reader connection signal, the card information signal; and provide the card information signal to a transaction processing component of the transaction device to permit the transaction processing component to process a transaction based on the card information signal.

9. The card reader device of claim 8, wherein the one or more processors, are further to:

generate the noise signal; and store the noise signal in the memory, wherein, the one or more processors, when determining the card information signal, are to:

determine the card information signal by subtracting the stored noise signal from the reader connection signal.

10. The card reader device of claim 8, wherein the one or more processors, when determining that the reader connection signal includes the card information signal, are to:

compare the reader connection signal and the noise signal;

determine that the reader connection signal and the noise signal are different; and determine, based on the reader connection signal and the noise signal being different from one another, that the reader connection signal includes the card information signal.

11. The card reader device of claim 8, wherein the card information signal is generated by the magnetic reader element sensing a magnetic field associated with the transaction card.

12. The card reader device of claim 8, wherein the one or more processors, when determining the card information signal, are to:

extract the card information signal from the reader connection signal by subtracting the noise signal from the reader connection signal.

13. The card reader device of claim 8, wherein the card reader device further comprises:

a card receiving element configured to perform a prereading process to verify that the transaction card can be used for the transaction, and wherein the one or more processors are further to:

determine that the card receiving element received the transaction card, wherein the noise signal is transmitted based on determining that the card receiving element received the transaction card.

14. The card reader device of claim 13, wherein the one or more processors, after transmitting the noise signal, are configured to:

transmit the standby signal.

15. A transaction device comprising:

a transaction processing component configured to process a transaction associated with a transaction card;

a magnetic reader element configured to generate a card information signal based on sensing a magnetic field associated with the transaction card; and a card reader control component, communicatively coupled to the magnetic reader element via a reader connection, the reader connection comprising an electrical connection, and the card reader control component configured to:

transmit a standby signal through the reader connection;

transmit, after transmitting the standby signal, a noise signal through the reader connection, wherein the noise signal is different from the standby signal;

monitor a reader connection signal associated with the reader connection to detect the card information signal within the reader connection, wherein the noise signal is configured to obfuscate the card information signal in the reader connection;

determine that the reader connection signal includes the card information signal based on the reader connection signal being different from the noise signal;

process the reader connection signal to determine the card information signal; and provide the card information signal to the transaction processing component to permit the transaction processing component to process the transaction.

16. The transaction device of claim 15, wherein the card reader control component is further to:

generate the noise signal to be a signal that prevents an unauthorized device from obtaining the card information signal from the reader connection signal.

17. The transaction device of claim 15, wherein the transaction device further comprises:

a card receiving element configured to receive the transaction card through a card slot of the transaction device, wherein the noise signal is transmitted through the reader connection based on the card receiving element receiving the transaction card through the card slot.

18. The transaction device of claim 15, wherein the card information signal carries card information associated with the transaction card, wherein the transaction processing component uses the card information to process the transaction.

19. The transaction device of claim 15, wherein the card reader control component, when processing the reader connection signal, is to:

subtract the noise signal from the reader connection signal to generate the card information signal from the reader connection signal.

20. The transaction device of claim 15, wherein the card reader control component is further to:

encrypt the card information signal to generate an encrypted card information signal, wherein card information associated with the transaction card is provided to the transaction processing component via the encrypted card information signal.

* * * * *